Sept. 19, 1967     F. J. BELLAVANCE ET AL     3,342,030
EXPANSION BRACELET WITH REMOVABLE LINKS
Filed Feb. 8, 1965     3 Sheets-Sheet 1
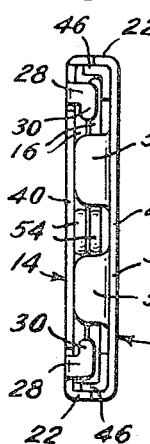
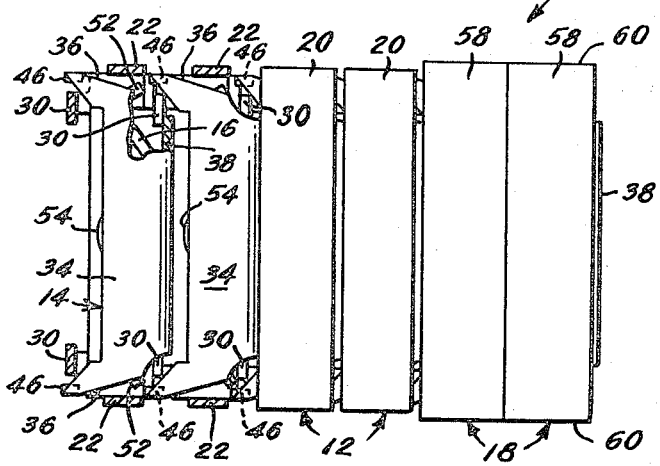
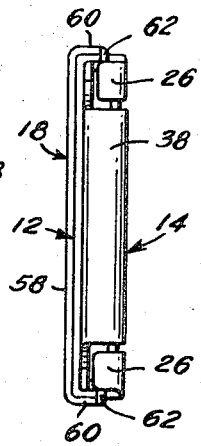
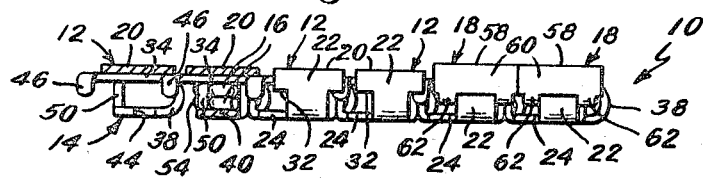
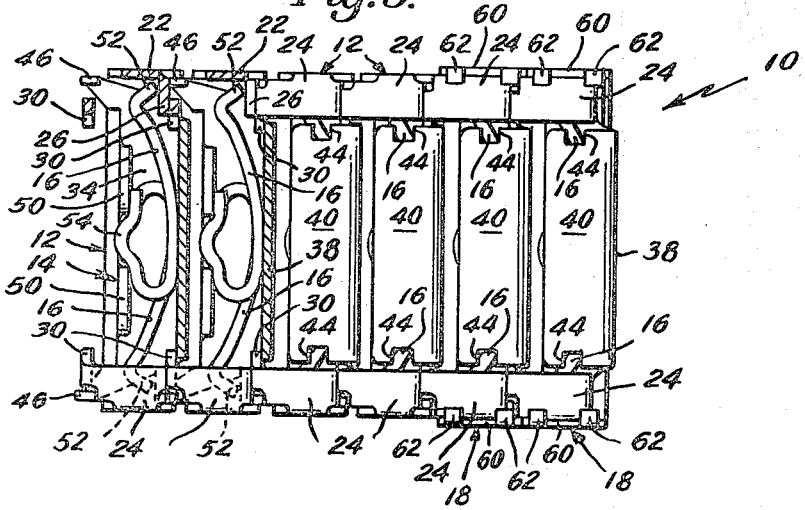
Inventors:
Francis J. Bellavance,
Richard W. Mueller,
by Salter & Michaelson
Att'ys.

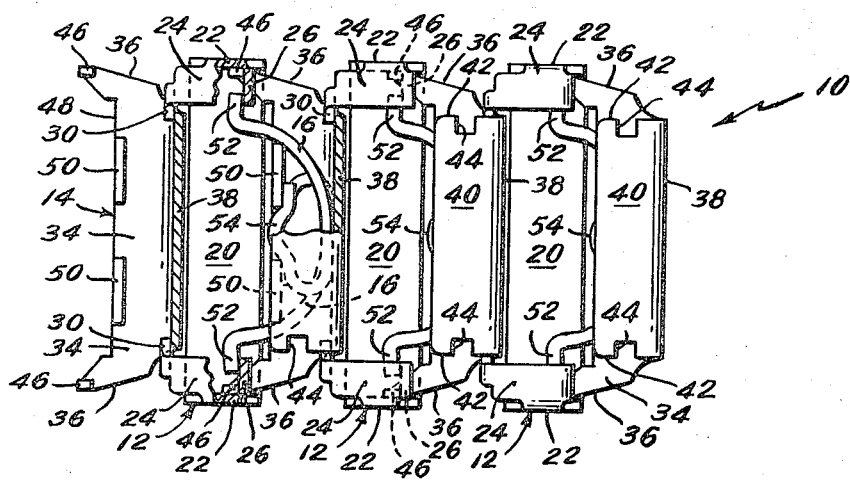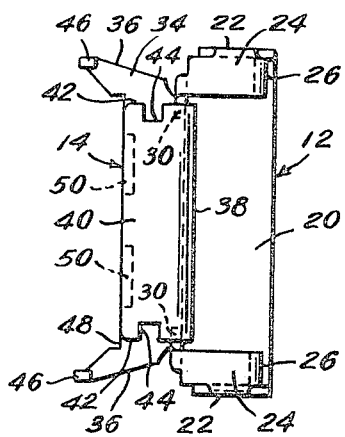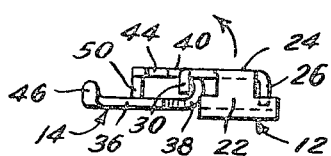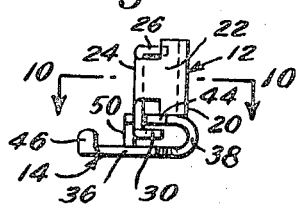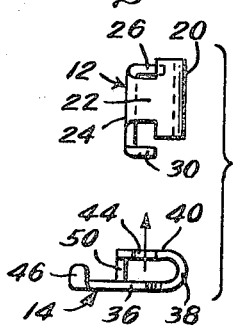

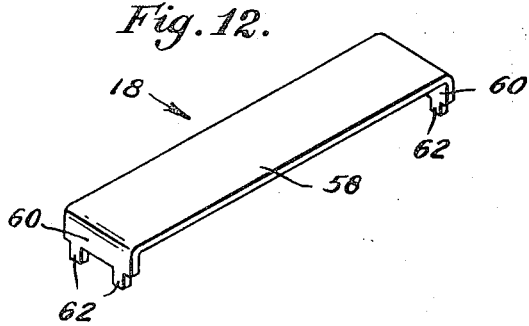
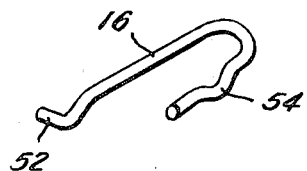
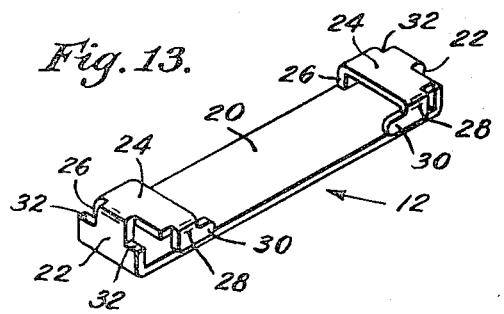
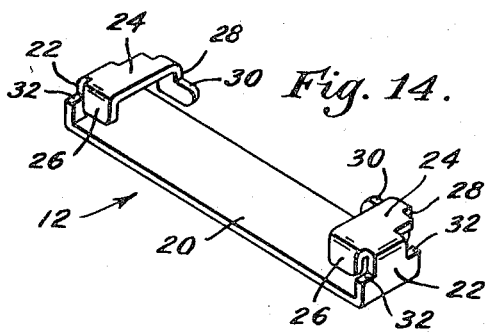
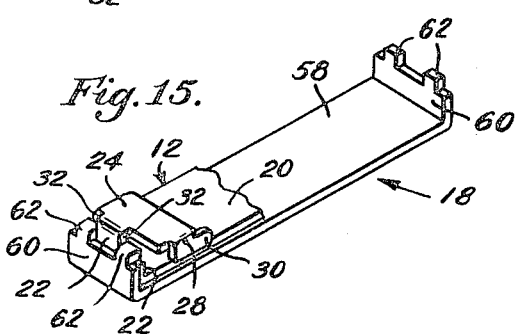
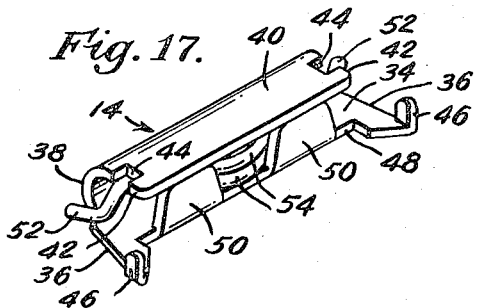

United States Patent Office 3,342,030
Patented Sept. 19, 1967

3,342,030
EXPANSION BRACELET WITH REMOVABLE LINKS
Francis J. Bellavance, North Attleboro, and Richard W. Mueller, Attleboro, Mass., assignors to Bellavance, Inc., Attleboro, Mass., a corporation of Massachusetts
Filed Feb. 8, 1965, Ser. No. 430,990
3 Claims. (Cl. 59—79)

ABSTRACT OF THE DISCLOSURE

An expansion bracelet having a plurality of side-by-side links movable with respect to each other to effect expansion of the bracelet, said links being readily detachable and attachable to each other so that links may be added or removed to lengthen or shorten the bracelet without the necessity of using special tools or equipment.

---

The present invention relates generally to an expansion bracelet of the type commonly utilized with wrist watches and the like, and is more particularly concerned with the provision of a bracelet of this type having novel and improved means for readily enabling the bracelet to be lengthened or shortened.

A primary object of this invention is the provision of an expansion bracelet which is readily separable at any point in order to facilitate the addition or removal of individual links in order that the bracelet may be shortened or lengthened to better fit a particular wearer, and wherein this objective may be accomplished without the necessity of utilizing any sort of separate equipment or tools.

Another object of this invention is the provision of a bracelet of the character described wherein likelihood of inadvertent separation of the links is virtually negligible.

A further object is the provision of an expansion bracelet that is highly flexible even to the extent where the bracelet can be easily fanned.

Another object is the provision of a bracelet of the character described wherein a particular structural arrangement is present for enabling use of a precious-metal outer shell for the links while at the same time maintaining costs at a minimum and strength at a maximum.

A further object is the provision of a bracelet of the character described having novel and improved spring means that not only are less expensive and easier to assemble than the spring means used heretofore in bracelets of this type, but which additionally provide a highly effective and reliable resilience in connection with expansion and contraction of the links.

Still another object is the provision of a bracelet of the character described that is rugged and durable in operation and use, economically feasible to manufacture, and comfortable to be worn.

Other objects, features and advantages of the invention will become apparent as the description thereof proceeds when considered in connection with the accompanying illustrative drawings.

In the drawings which illustrate the best mode presently contemplated for carrying out the present invention:

FIG. 1 is a top plan view of an expansion bracelet constructed in accordance with our invention with some parts removed and others broken away for purposes of illustration;

FIG. 2 is an end elevational view looking from the left with respect to FIG. 1;

FIG. 3 is an end elevational view looking from the right with respect to FIG. 1;

FIG. 4 is a side elevational view of the bracelet shown in FIG. 1;

FIG. 5 is a bottom plan view of the bracelet shown in FIG. 1;

FIG. 6 is a bottom plan view of a portion of the bracelet in expanded position, with certain parts removed and broken away for purposes of illustration;

FIG. 7 is a bottom view of a single link housing and link element in assembled relation;

FIG. 8 is a side elevational view of the parts shown in FIG. 7;

FIG. 9 is a side elevational view of the parts shown in FIG. 7 after manipulation to a position enabling separation of the elements;

FIG. 10 is a section taken on line 10—10 of FIG. 9;

FIG. 11 is an elevational view illustrating the parts shown in FIGS. 7 through 10 after separation thereof;

FIG. 12 is a perspective view of the outer shell which forms a part of our invention;

FIG. 13 is a perspective view of the link housing which forms a part of our invention;

FIG. 14 is a perspective view of the link housing shown in FIG. 13 from the other side thereof;

FIG. 15 is a perspective view illustrating the assembly of the parts shown in FIGS. 12 and 13, with portions broken away and omitted for purposes of illustration;

FIG. 16 is a perspective view of one of the spring elements that forms a part of our invention; and FIG. 17 is a perspective view showing one of the link elements that forms a part of our invention with the springs assembled therein.

Referring now to the drawings, there is shown generally at 10 an expansible bracelet construction comprising a total of three different essential parts and a fourth part not actually essential to successful operation of the device but highly desirable for reasons hereinafter to be set forth. The three essential parts are a link housing shown generally at 12 (FIGS. 13 and 14), a link element shown generally at 14 (FIG. 17), and spring 16 shown in detail in FIG. 16. The additional optional part is outer shell 18 shown in detail in FIG. 12.

As will be seen most clearly in FIGS. 13 and 14, the link housing 12, which preferably is constructed of any suitable metallic material, such as stainless steel, for example, comprises an elongated generally rectangular top wall 20 having at its opposite ends integrally extending end walls 22, each of which has integrally extending therefrom bottom walls 24. As will be clearly seen, the bottom walls 24 underlie only the end portions of top wall 20 and are in substantially parallel disposition with respect thereto. At the opposite sides of each of the bottom walls 24 there is provided a pair of integral, inwardly extending lugs, 26, 28, it being noted that the aligned lugs 28 each have extensions 30 extending toward the central portion of housing 12. As will be seen most clearly in FIGS. 2 and 3, the lugs 26 and 28 extend most of the way to top wall 20 but terminate in spaced relation thereto. It will further be noted that the lugs 28 and their extensions 30 are located in a plane slightly outside of the adjacent edge of top wall 20. For reasons hereinafter to be made apparent, the end walls 22 each have oppositely disposed notches 32 therein.

Turning now to link element 14, it will be understood that this element is also constructed of any suitable metallic material, such as stainless steel or the like. The link element 14 comprises a top wall 34 having inclined end edges 36 and further having a rounded side wall 38 and a bottom wall 40 extending integrally therefrom in underlying relation with respect to top wall 34 and in substantially parallel disposition with respect thereto. It will be understood that although top walls 20 and 34 are illustrated in some of the drawings as being on the bottom, this is purely for simplicity and clarity of illustration, and in actual use of these parts, as will hereinafter become apparent, the walls 20 and 34 are upwardly or outwardly disposed with respect to the wearer's wrist. The opposite end edges 42 of bottom wall 40 are preferably spaced from each other a distance just slightly less than the spacing that exists between bottom walls 24 of housing 12, and said end edges 42 have disposed therein a pair of aligned inwardly extending notches 44. The divergent outer edges of top wall 34 each have an integral, upwardly extending stop lug 46, while the free longitudinal edge 48 of top wall 34 is provided with a pair of integral, upwardly extending ears 50 extending into engagement with the adjacent edge of bottom wall 40.

Each link element 14 has mounted therein a pair of spring members 16 in a manner now to be described. The springs 16 are constructed of any suitable resilient wire stock, and are preferably in the neighborhood of .012 inch in diameter. As will be seen most clearly in FIG. 16, the spring 16 is of generally U-shaped configuration with one of the legs of the spring slightly longer than the other, said longer leg terminating in a bent outer portion 52. The other leg, which is the shorter one, has a hump-like bend 54 formed therein. When assembled within link element 14, the two springs 16 are positioned one on top of the other so that the humps 54 extend into the space between the ears 50, thus maintaining the springs in their desired position and relation with respect to the element 14. In this position, the outer portion 52 of each spring extends outwardly from opposite ends of the link element 14, as illustrated most clearly in FIGS. 5, 6 and 17. It is possible instead of using two separate springs 16 within each link element, as above described, to use a single spring (not shown) looped at its center portion so that its free ends extend outwardly in opposite directions. The center loop would then have a hump formed therein similar to the aforedescribed humps 54 in order to maintain the spring properly positioned within the link element. It has been found, however, that the use of two separate springs, as illustrated and described herein, is highly advantageous in that the two separate springs are easier to handle and assemble than is the case where one spring is employed and further have been found to provide a more reliable and effective spring action. For these reasons, experience has shown that the use of the two separate springs actually results in a financial saving in the manufacture of the bracelet 10, and the use of two springs is therefore thought to constitute an important feature of our invention.

The assembly of the link elements 14 and their associated springs 16 with the link housings 12 will now be described. Referring to FIGS. 1, 4 and 5, and with the bracelet 10 in its normal retracted or closed position, it will be seen that each housing 12 has a link member 14 positioned substantially therein. Specifically, the relation is such that the top wall 34 of each link member 14 bears against the inner surface of top wall 20 of housing 12. At the same time, the bottom wall 40 of element 14 is positioned between the inner edges of the bottom walls 24 and in substantially the same plane thereas. Actually, the link elements 14 are not centered within each housing 12, but rather there is a slight overlapping of adjacent housings 12 by each link element 14. This is because the extensions 30 of each housing 12 are extending into the next adjacent link member 14 and, more specifically, are in engagement with the inner surface of the side wall 38 of the said next adjacent link member. This is illustrated most clearly in FIGS. 1 and 5, it being noted in these figures that the extensions 30 of each housing 12 are disposed in the next-adjacent link element 14 to the left. At the same time, the end portions 52 of the springs 16 engage and bear against the inner surface of the lugs 26 of the housing 12 within which the elements 14 are most substantially positioned. This resiliently maintains the bracelet 10 in the closed or retracted position illustrated in FIGS. 1 and 5. When the housings 12 are pulled apart so as to expand or open the bracelet 10, wherein the parts assume the position illustrated in FIG. 6, the engagement of the extensions 30 within the next-adjacent link element 14 causes the link elements to move slidably and transversely with respect to the housing 12 within which the link element is normally positioned. As a result of this movement, the spaced-apart housings 12 are bridged by the link members 14. As the housings 12 are pulled apart and the link members 14 are slid to the intermediate position illustrated in FIG. 6, the springs 16 are tensioned due to the fact that the ends of the spring are engaged by the lugs 26 while the central portions of the springs are moved with relation thereto due to the fact that the central portions of the springs are mounted within and carried by the link elements 14 during their aforedescribed slidable transverse movement. Thus, when the bracelet 10 is opened or expanded, such movement takes place against the action of the springs 16, whereupon when the outward pull on the bracelet is relaxed, the springs 16 will cause automatic retraction of the housings 12 with respect to each other until the position of the parts illustrated in FIGS. 1 and 5 is again achieved. A positive limit stop is provided with respect to opening or expansion of the bracelet by virtue of the fact that each link element 14 can be slid transversely with respect to the housing 12 within which it is normally positioned only until the stop lug 46 engages the lug 26.

An important feature of our invention is the means by which the bracelet 10 may be separated at any point without the necessity of using any instruments or tools of any sort, thus making it extremely facile for one to shorten or lengthen the bracelet to insure the best possible fit on the wearer's wrist. In order to effect this separation, it is first necessary to stretch or expand the bracelet to the position illustrated in FIG. 6 wherein the link elements 14 are located between adjacent housings 16 and wherein the notches 44 are therefore unobstructed. With the parts in this position, as also illustrated in FIGS. 7 and 8, the next step is to pivot the housing 12 approximately 90° in the direction of the arrow illustrated in FIG. 8 until the parts assume the relative position illustrated in FIGS. 9 and 10. Once the parts have assumed this position, the housing 12 is slidably moved with respect to the link element 14 until the extensions 30 of the latter are in alignment with the notches 44 of the former. This is actually the position of the parts illustrated in FIG. 10. Once the parts are in this position, they may be readily detached simply by lifting the housing 12 with respect to the link element 14 whereupon the extensions 30 will pass freely out through notches 44. It is, of course, important that the notches 44 be dimensioned so as to be sufficiently large so as to enable the extensions 30 to pass outwardly therethrough. In order to assemble the parts, the reverse procedure is followed. It has been found that by providing notches 44 at both edges of link element 14, it becomes much easier to separate and assemble adjacent housings and link elements than would be the case where only one such notch is provided.

It has been found that in order for the bracelet 10 to be sufficiently strong and durable, the housings 12 should be constructed of metallic stock having a minimum thickness of approximately .015 inch. This creates a practical problem where it is desired to either engrave or otherwise design the outer surfaces of top walls 20 or where it is desired to construct the bracelet of a precious metal. The problem here is that stock of this thickness is somewhat difficult to strike or engrave with a suitable design, while to use precious metal or even gold filled where the minimum thickness requirement is .015 inch results in an extremely costly bracelet. In order to overcome this problem, we prefer to utilize outer shell 18 as a covering for the housings 12. In this way, the housings 12 may be constructed of thicker stock so as to meet the strength requirements and at the same time may be of a less costly metal, such as stainless steel. The outer shell 18, on the other hand, since it need not meet any strength requirements, may be relatively thin, for example, in the neighborhood of .006 to .008 inch in thickness, thus making it economically feasible to use gold filled or other precious metal for this shell and at the same time facilitating striking or otherwise applying a design to the outer surface of the shell, this becoming much easier to do in view of the relative thinness thereof. As will be seen most clearly in FIG. 12, the outer shell 18 comprises a flat wall 58 sufficiently large so as to completely overlie top wall 20 of each housing 12. The wall 58 has at opposite ends thereof integral perpendicular flanges 60, each of which has extending therefrom a pair of spaced lugs 62. In assembly, the shell 18 is simply superimposed over the outer surface of top wall 20 so that flanges 60 overlie end walls 22, and then the lugs 62 are bent inwardly whereupon they are received by the notches 32, note FIG. 15. In this way, the outer shells 18 may be easily secured to the housings 12 without in any way affecting or interfering with the operation of the bracelet, as hereinbefore described.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. An expansion bracelet construction comprising a plurality of housings, each comprising an elongated flat top wall, end walls extending inwardly at opposite ends of said top wall, said end walls having notches extending inwardly from opposite side edges thereof, and bottom walls extending from said end walls in substantially parallel underlying relation with respect to the end portions of said top wall, said bottom walls each having inturned lugs at opposite sides thereof, with the aligned lugs at one side of said bottom walls each having extensions extending beyond the inner edges of said bottom walls toward the central portion of the housing, the combination further comprising a link element mounted within each housing and transversely movable with respect thereto, each link element comprising a top wall slidable against the inner surface of the housing top wall, a side wall extending downwardly from one side edge of said link top wall, an open side opposite from said side wall, and a bottom wall extending from said side wall in underlying relation to said link top wall, the end edges of said link bottom wall being located slightly inwardly of the edges of said housing bottom walls and in substantially the same plane, the end edges of said link top wall being inclined outwardly from said link side wall, spring means mounted within each link element and having end portions extending outwardly from opposite ends of the link element, said spring end portions engaging said housing so as to normally maintain said link element substantially within said housing, the lug extensions of the next-adjacent housing extending into said link element and engaging the inner surface of said link side wall thus interconnecting each link element to said next-adjacent housing whereby when adjacent housings are pulled apart, each link element will be carried transversely by the next-adjacent housing and will slide transversely with respect to the housing it is normally positioned within against the action of the aforesaid spring means, means for enabling separation of the bracelet at any desired point in order to facilitate shortening and lengthening of the bracelet, said means comprising aligned notches extending inwardly from the end edges of said link bottom wall, said notches being sufficiently large to permit passage therethrough of the said lug extensions of the next-adjacent housing when manipulated so as to be aligned with said notches, and an outer shell superimposed over the outer surface of said housing top wall, said shell having flanges at opposite ends thereof bent over into engagement with the housing end walls, and lugs carried by said flanges and engaging the notches in said end walls for effecting four-point securement of said outer shell to said housing.

2. The bracelet of claim 1 further characterized in that said spring means comprises two separate wire springs.

3. The bracelet of claim 1 further characterized in that said spring means comprises two separate wire springs each having reversly bent inner parts superimposed on each other, said inner parts having aligned hump-like portions extending outwardly from the open side of said link element, and means carried by said link element for maintaining said springs assembled therein, said means comprising a pair of spaced integral ears overlying the open side of said link element, the space between said ears receiving therein said hump-like portions, thus positioning said springs with respect to said link element.

References Cited

UNITED STATES PATENTS 3,140,581  7/1964  Hauser _____ 59—79

FOREIGN PATENTS 1,330,635  5/1963  France.
962,211  4/1957  Germany.
1,029,181  4/1958  Germany.
1,060,636  7/1959  Germany.
603,930  4/1960  Italy.

CHARLES W. LANHAM, *Primary Examiner.*

G. P. CROSBY, *Assistant Examiner.*